(12) United States Patent
Lee

(10) Patent No.: US 12,557,224 B2
(45) Date of Patent: Feb. 17, 2026

(54) DISPLAY DEVICE INCLUDING CORRUGATED PANEL

(71) Applicant: LG Display Co., Ltd., Seoul (KR)

(72) Inventor: PyungYong Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 295 days.

(21) Appl. No.: 18/446,887

(22) Filed: Aug. 9, 2023

(65) Prior Publication Data

US 2024/0215180 A1    Jun. 27, 2024

(30) Foreign Application Priority Data

Dec. 26, 2022   (KR) .......................... 10-2022-0184774

(51) Int. Cl.
| | | |
|---|---|---|
| H05K 5/02 | (2006.01) | |
| G02F 1/1333 | (2006.01) | |
| G06F 1/16 | (2006.01) | |
| G09F 9/33 | (2006.01) | |
| H10K 59/80 | (2023.01) | |
| H10K 77/10 | (2023.01) | |

(52) U.S. Cl.
CPC ......... *H05K 5/02* (2013.01); *G02F 1/133314* (2021.01); *G09F 9/335* (2021.05); *H10K 59/80* (2023.02); *G02F 1/133305* (2013.01); *G06F 1/1641* (2013.01); *H05K 5/0217* (2013.01); *H10K 77/111* (2023.02)

(58) Field of Classification Search
CPC ................ H05K 5/02; G02F 1/133314; G02F 1/133308; G09F 9/335; H10K 59/80; B32B 3/26; B32B 3/28; G06F 1/1601; G06F 1/1637; G09G 3/3208
See application file for complete search history.

(56) References Cited

U.S. PATENT DOCUMENTS

| | | | | |
|---|---|---|---|---|
| 6,407,781 | B2 * | 6/2002 | Kitada | G02F 1/133604 |
| | | | | 349/113 |
| 9,058,758 | B2 * | 6/2015 | Shin | G06F 1/1601 |
| 9,456,525 | B2 * | 9/2016 | Yoon | H05K 7/20972 |
| 9,661,764 | B2 * | 5/2017 | Jung | G06F 1/1601 |
| 9,685,636 | B2 * | 6/2017 | Park | H10K 59/8794 |
| 11,360,514 | B2 * | 6/2022 | Lee | G06F 1/1601 |
| 11,979,995 | B2 * | 5/2024 | Jiang | G06F 1/1637 |
| 12,013,729 | B2 * | 6/2024 | Yang | G06F 1/1616 |

(Continued)

FOREIGN PATENT DOCUMENTS

| | | | | |
|---|---|---|---|---|
| KR | 10-0296297 B1 | 8/2001 | | |
| KR | 102081112 B1 * | 2/2020 | ....... | G02F 1/133308 |
| KR | 20200076852 A * | 6/2020 | ....... | G02F 1/133322 |

*Primary Examiner* — Allen L Parker
*Assistant Examiner* — Martin Antonio Asmat Uceda
(74) *Attorney, Agent, or Firm* — Fenwick & West LLP

(57) ABSTRACT

According to an aspect of the present disclosure, a display device includes a display panel configured to display an image; a corrugated panel on a rear surface of the display panel, the corrugated panel comprising a first skin layer, a second skin layer, and a core layer between the first skin layer and the second skin layer; and a back cover that encloses the display panel and the corrugated panel, wherein at least one of the first skin layer or the second skin layer comprises an opening through a thickness of the at least one of the first skin layer or the second skin layer to improve the appearance quality of the display device.

15 Claims, 9 Drawing Sheets

(56) References Cited

U.S. PATENT DOCUMENTS

| | | | |
|---|---|---|---|
| 12,225,673 B2* | 2/2025 | Lee | G06F 1/1637 |
| 12,235,681 B2* | 2/2025 | Park | G09F 9/301 |
| 2013/0314638 A1* | 11/2013 | Ahn | G02F 1/133308 |
| | | | 349/58 |
| 2013/0335892 A1* | 12/2013 | Ha | G06F 1/1637 |
| | | | 361/679.01 |
| 2017/0141173 A1* | 5/2017 | Choi | G06F 1/1616 |
| 2020/0037458 A1* | 1/2020 | Si | H04M 1/0268 |
| 2020/0245501 A1* | 7/2020 | Wu | F28F 3/02 |
| 2021/0064100 A1* | 3/2021 | Hwang | G06F 1/1601 |
| 2021/0208462 A1* | 7/2021 | Wu | G02F 1/133602 |
| 2022/0396050 A1* | 12/2022 | Zhu | B32B 3/30 |
| 2023/0016932 A1* | 1/2023 | Nirmal | B32B 3/28 |
| 2024/0241538 A1* | 7/2024 | Shin | G06F 1/1616 |

* cited by examiner

DISPLAY DEVICE INCLUDING CORRUGATED PANEL

CROSS-REFERENCE TO RELATED APPLICATION

This application claims the priority of Republic of Korea Patent Application No. 10-2022-0184774 filed on Dec. 26, 2022, in the Korean Intellectual Property Office, which is incorporated by reference in its entirety.

BACKGROUND

Field

The present disclosure relates to a display device including a corrugated panel.

Description of the Related Art

As display devices which are used for a monitor of a computer, a television, or a cellular phone, there are an organic light emitting display (OLED) device which self-emits light and a liquid crystal display (LCD) device which requires a separate light source.

An applicable range of the display device is diversified to not only monitors of computers and televisions (TVs), but also personal portable devices and the necessity for large-sized TVs is emerging in particular.

Accordingly, not only should the rigidity of the large display device should be secured, but the large display device should also be light weight.

Therefore, research on various structures has been conducted in order to secure the rigidity and reduce the weight of large display devices.

SUMMARY

An object to be achieved by the present disclosure is to provide a display device which has high rigidity and light weight.

Another object to be achieved by the present disclosure is to provide a display device which is capable of securing an appearance quality even in various processes.

Objects of the present disclosure are not limited to the above-mentioned objects, and other objects, which are not mentioned above, can be clearly understood by those skilled in the art from the following descriptions.

In one embodiment, a display device comprises: a display panel configured to display an image; a corrugated panel on a rear surface of the display panel, the corrugated panel comprising a first skin layer, a second skin layer, and a core layer between the first skin layer and the second skin layer; and a back cover that encloses the display panel and the corrugated panel, wherein at least one of the first skin layer or the second skin layer comprises an opening through a thickness of the at least one of the first skin layer or the second skin layer.

In one embodiment, a display device comprises: a display panel configured to display an image; a back cover including a cavity; and a corrugated panel between the display panel and the back cover such that the display panel and the corrugated panel are disposed in the cavity of the back cover, wherein the corrugated panel includes an opening through at least a portion of the corrugated panel.

Other detailed matters of the exemplary embodiments are included in the detailed description and the drawings.

According to the present disclosure, bending rigidity and torsional rigidity of the display device may be improved.

According to the present disclosure, it is advantageous to secure the appearance quality.

According to the present disclosure, both the efficiency of the press process and the rigidity of the display device may be secured.

The effects according to the present disclosure are not limited to the contents exemplified above, and more various effects are included in the present specification.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
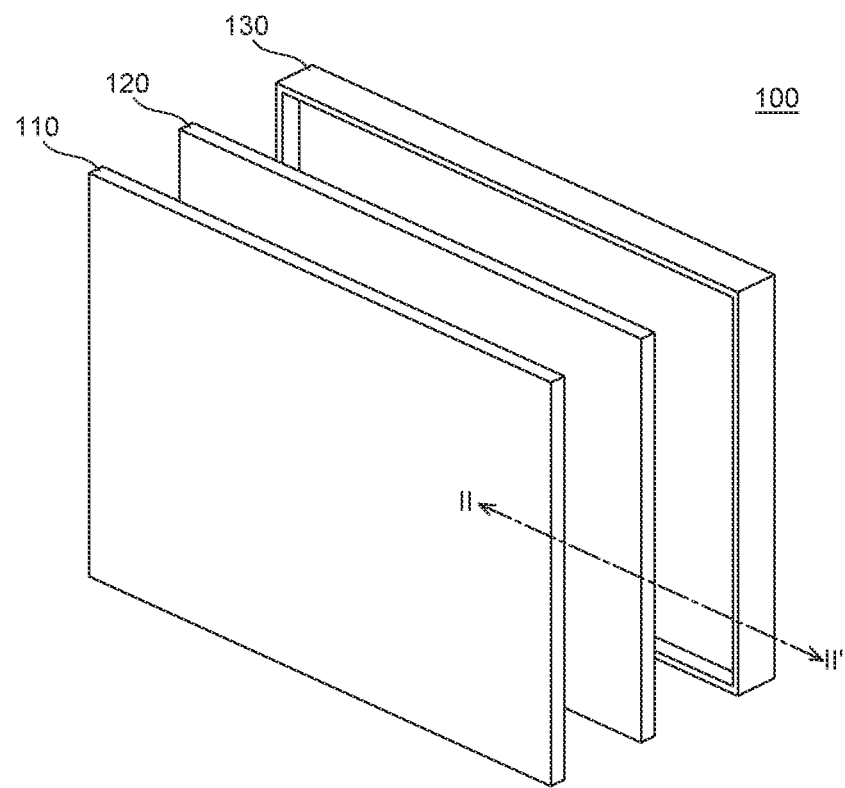
FIG. 1 is an exploded perspective view illustrating a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, various exemplary embodiments of the present disclosure will be described in detail with reference to accompanying drawings.

FIG. 1 is an exploded perspective view illustrating a display device according to an exemplary embodiment of the present disclosure.

As illustrated in FIG. 1, a display device 100 according to an exemplary embodiment of the present disclosure includes a display panel 110 which configured to display an image, a corrugated panel 120, and a back cover 130 for accommodating the display panel 110.

Even though it is not illustrated in FIG. 1, the display device 100 according to an exemplary embodiment of the present disclosure may further include a driving integrated circuit and a driving printed circuit board for driving the display panel 110.

As a coupling state of the display device 100 including the above-described components, in a state where the corrugated panel 120 is disposed on the rear surface of the display panel 110, the back cover 130 is coupled to the display panel 110 on a rear side of the display panel 110 to be integrated with the display panel 110.

The display panel 110 is a panel for displaying images. The display panel 110 may be any one of various display panels, such as an organic light emitting display panel, a liquid crystal display panel, a field emission display panel, and an electro-wetting display panel. Hereinafter, as an example, it is described that the display panel of the display device according to an exemplary embodiment of the present disclosure is an organic light emitting display panel.

Figure 2:
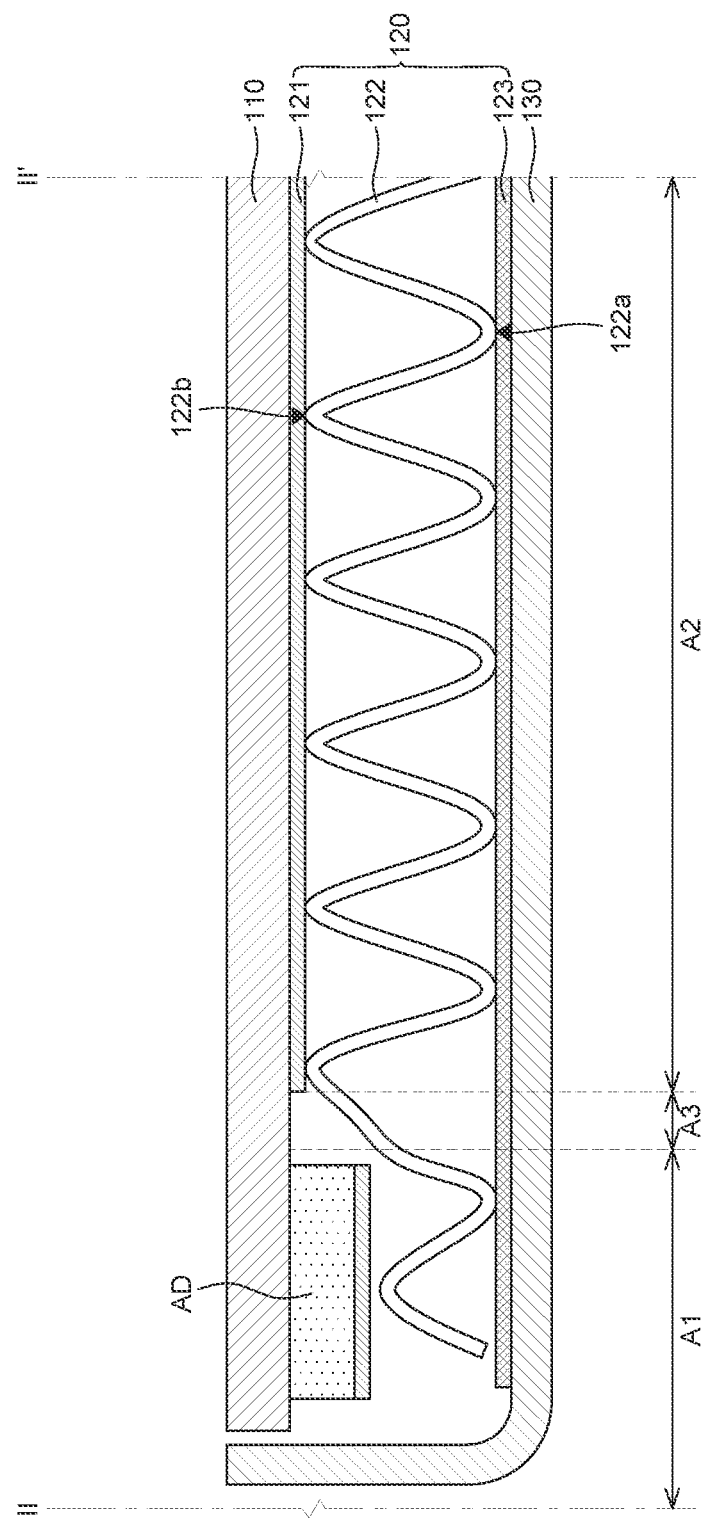
FIG. 2 is a cross-sectional view taken along the line II-II' of FIG. 1 according to an exemplary embodiment of the present disclosure.

FIG. 2 is a cross-sectional view taken along the line II-II' of FIG. 1 according to an exemplary embodiment of the present disclosure. Specifically, FIG. 2 is a cross-sectional view of a display panel, a corrugated panel, and a back cover of a display device according to an exemplary embodiment of the present disclosure.

Figure 3:
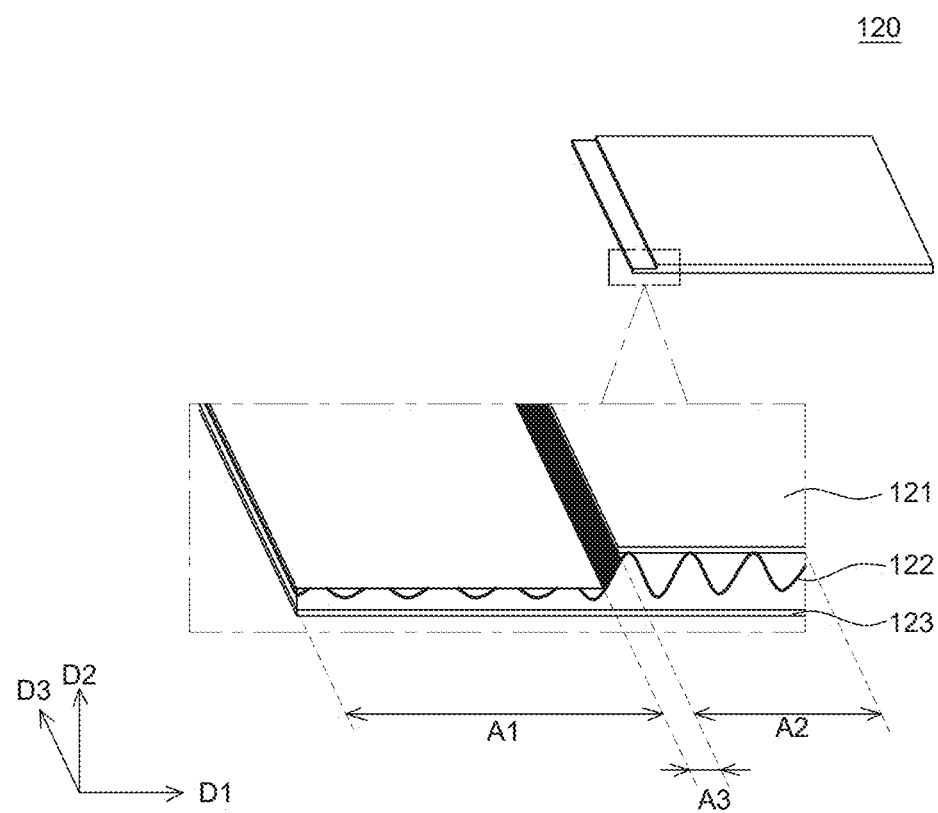
FIG. 3 is a perspective view of a corrugated panel of a display device according to an exemplary embodiment of the present disclosure.

FIG. 3 is a perspective view of a corrugated panel of a display device according to an exemplary embodiment of the present disclosure.

Referring to FIG. 2, the display device 100 according to the exemplary embodiment of the present disclosure includes a display panel 110, a corrugated panel 120 disposed on a rear surface of the display panel 110, and a back cover 130 which encloses the display panel 110 and the corrugated panel 120. In one embodiment, the back cover 130 includes a cavity in which the back cover 130 and the display panel 110 are disposed.

The display panel 110 may be an organic light emitting display panel including an organic light emitting diode.

The above-described organic light emitting diode includes a first electrode which is supplied with a current from a driving transistor disposed for every unit pixel, a second electrode corresponding to the first electrode, and an organic layer disposed between the first electrode and the second electrode.

The first electrode may be formed of a transparent electrode material, and the second electrode may be formed of a metal material. The organic layer may include an organic emission layer which emits light, an electron injection layer and a hole injection layer which inject electrons and holes to the organic emission layer, respectively, an electron transport layer and a hole transport layer which transmit injected electrons and holes to the emission layer, respectively, and a charge generation layer which generates charges, such as electrons or holes.

An emission method of the organic light emitting diode will be described. Holes are injected from the first electrode into the organic layer so that the holes reach the organic emission layer via the hole injection layer and the hole transport layer. Electrons are injected from the second electrode to the organic layer so that the electrons reach the organic emission layer via the electron injection layer and the electron transport layer. By doing this, in the organic emission layer, the holes and the electrons are coupled to form excitons to emit light.

The corrugated panel 120 may be attached onto the rear surface of the display panel 110 by means of an adhesive layer AD.

The adhesive layer AD is disposed at the outside of the rear surface of the display panel 110 to bond the outside of the display panel 110 and the outside of the corrugated panel 120. However, the placement area of the adhesive layer AD is not limited thereto and may vary in various forms.

At this time, the adhesive layer AD may be a layer having a predetermined thickness. The adhesive layer AD may include a moisture absorbent which absorbs moisture to protect the organic light emitting diode from the moisture.

The corrugated panel 120 may include a first skin layer 121, a second skin layer 123, and a core layer 122 disposed between the first skin layer 121 and the second skin layer 123. The first skin layer 121, the second skin layer 123, and the core layer 122 may be coupled to each other.

The first skin layer 121 may form a front surface of the corrugated panel 120. The second skin layer 123 may form a rear surface of the corrugated panel 120. The first skin layer 121 and the second skin layer 123 may include a metal material. For example, the first skin layer 121 and the second skin layer 123 may include an aluminum (Al) material. For example, thicknesses of the first skin layer 121 and the second skin layer 123 may each be approximately 0.5 mm. The first skin layer 121 and the second skin layer 123 may be opposite each other to the core layer 123 to be described below.

The core layer 123 may be disposed between the first skin layer 121 and the second skin layer 123.

The core layer 122 may include a wavy core with respect to a plane of the first direction D1 and the second direction D2. Specifically, the core may have a corrugated shape in which ridges 122a and grooves 122b are alternately formed with respect to the plane for the first direction D1 and the second direction D2. That is, each ridge 122a is a protrusion that protrudes from a centerline of the core layer 122 away from the first skin layer 121 and toward the second skin layer 123 whereas each groove 122b is a protrusion that protrudes from the centerline of the core layer 122 away from the second skin layer 123 towards the first skin layer 121. The centerline of the core layer 122 extends along the direction D1 in a cross-section view of the display device 100. For example, the core layer 122 may be formed to be wrinkled with a wavy shape.

Therefore, the bending rigidity of the display device and a torsional rigidity in the third direction D3 may be improved.

The back cover 130 accommodates the display panel 110 and the corrugated panel 120 and may be bonded with the rear surface of the display panel 110 by the adhesive layer AD.

The back cover 130 may be formed of any one of aluminum (Al), copper (Cu), zinc (Zn), silver (Ag), gold (Au), or iron (Fe) having a high thermal conductivity or an alloy of the above-mentioned metals. The back cover 130 is desirably formed with aluminum (Al) having a high conductivity, a light weight, and a low cost.

In the meantime, the display device according to the exemplary embodiment of the present disclosure may be divided into a first area A1, a second area A2, and a third area A3 according to the shape of the corrugated panel 120.

A thickness of a first portion of the corrugated panel 120 disposed in the first area A1 and a thickness of a second portion of the corrugated panel 120 disposed in the second area A2 may be different.

The adhesive layer AD is disposed between the corrugated panel 120 and the display panel 110 disposed in the first area A1 so that the thickness of the corrugated panel 120 disposed in the first area A1 may be thinner than the portions of the corrugated panel 120 in the second area A2 and the third area A3.

The adhesive layer AD is not disposed between the corrugated panel 120 and the display panel 110 disposed in the second area A2 so that the thickness of the corrugated panel 120 disposed in the second area A2 may be thicker than the portions of the corrugated panel 120 in the second area A2 and the first area A1.

That is, a distance between the first skin layer 121 and the second skin layer 123 disposed in the first area A1 and a distance between the first skin layer 121 and the second skin layer 123 disposed in the second area A2 may be different. In other words, the thickness of the core layer 122 disposed in the first area A1 or the distance between the end of the ridge 122b and the end of the groove 122a in the first area A1 may be different from the thickness of the core layer 122 disposed in the second area A2 or the distance between the end of the ridge 122b and the end of the groove 122a of the core.

To be more specific, a distance between the first skin layer 121 and the second skin layer 123 disposed in the first area A1 may be shorter than a distance between the first skin layer 121 and the second skin layer 123 disposed in the second area A2. In other words, the thickness of the core layer 122 disposed in the first area A1 may be thinner than the thickness of the core layer 122 disposed in the second area A2. Alternatively, the distance between the end of the ridge 122b and the end of the groove 122a disposed in the first area A1 may be shorter than the distance between the end of the ridge 122b that is contact with the first skin layer 121 and the end of the groove 122a that is in contact with the second skin layer 122 disposed in the second area A2.

In the meantime, at least one opening may be formed in at least one of the first skin layer 121 and the second skin layer 123 disposed in the third area A3.

Specifically, as illustrated in FIG. 3, the first skin layer 121 of the third area A3 extending in the third direction D3 may include a rectangular opening disposed in one axial direction extending in the third direction D3.

As described above, in the display device according to the exemplary embodiment of the present disclosure, at least one opening may be formed in at least one of the first skin layer 121 and the second skin layer 123.

Unlike the display device according to the exemplary embodiment of the present disclosure, when the opening is not formed in the first skin layer 121 and the second skin layer 123, if a press process is performed on a partial area of the first skin layer 121, a stress caused by the press is transmitted to the second skin layer 123 corresponding to the partial area of the first skin layer 121 due to the coupling of the plurality of skin layers 121 and 123 and the core layer 122.

Accordingly, there was a problem in that the second skin layer 123 was dented or the appearance quality was degraded.

In contrast, as in the display device 100 according to the exemplary embodiment of the present disclosure, when at least one opening is formed in at least one of the first skin layer 121 and the second skin layer 123, if the press process is performed in a partial area of the first skin layer 121, the second skin layer 123 is not dented or appearance quality is not degraded due to the opening in the first skin layer allowing the core layer 120 to flex. Therefore, the stress caused by the press is not transmitted to the core layer 122.

Accordingly, even though the plurality of skin layers 121 and 123 and the core layer 122 are coupled, the stress caused by the press is not transmitted to the core layer 122 so that the stress caused by the press is not transmitted to the second skin layer 123.

As a result, it is advantageous to secure the appearance quality of the display device according to the exemplary embodiment of the present disclosure.

FIGS. 4 to 11 are perspective views illustrating shapes of various openings of a display device according to an exemplary embodiment of the present disclosure. In the embodiments of FIGS. 4 to 11, the thickness of the core 122 is uniform along the direction D1 in contrast to the embodiment of FIG. 3.

Figure 4:
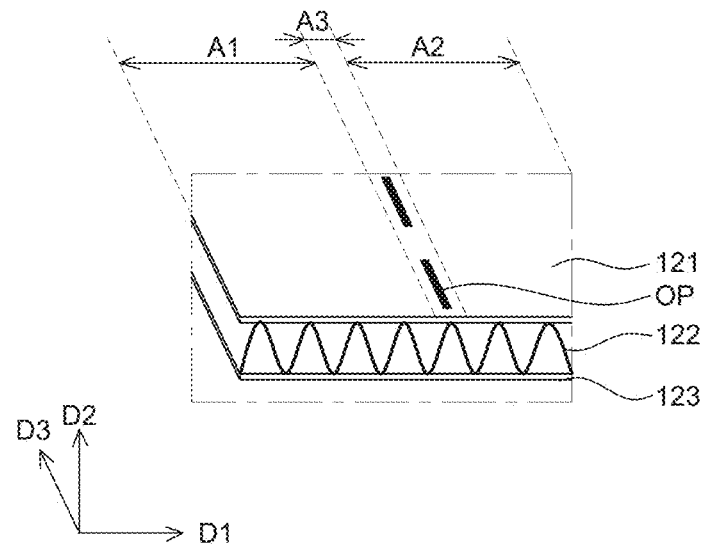
FIGS. 4 to 11 are perspective views illustrating shapes of various openings of a display device according to an exemplary embodiment of the present disclosure.

Referring to FIG. 4, in the third area A3, at least one rectangular opening OP disposed in one axial direction extending to the third direction D3 may be disposed. That is, the corrugated panel 120 has at least one rectangular opening OP in a plan view of the display device.

That is, the at least one rectangular opening OP may be disposed to extend to be parallel to one straight line extending to the third direction D3. That is, the length of each rectangular opening OP extends in the direction D3 and the width of each rectangular opening that is less than the length extends in the direction D1. In FIG. 4, the pair of rectangular openings OP are aligned with each other in the direction D3.

As the above-described opening OP is formed, when the press process is performed in one of the first area A1 and the second area A2, the stress transmission between the third area A3 and an area in which the press process is performed may be reduced. Accordingly, it is advantageous to secure the appearance quality of the display device.

Figure 5:
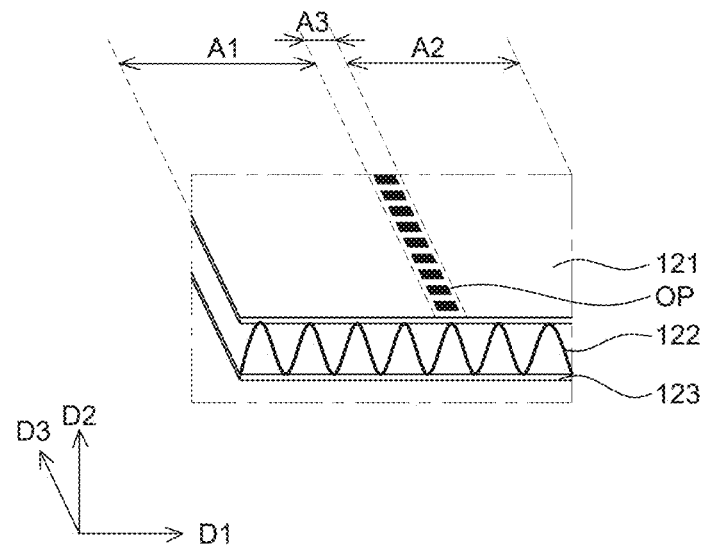

Referring to FIG. 5, in the third area A3, at least one rectangular opening OP disposed in one axial direction extending to the third direction D3 may be disposed. That is, the corrugated panel 120 has at least one rectangular opening OP in the plan view of the display device.

That is, the at least one rectangular opening OP may be disposed to extend to be perpendicular to one straight line extending to the third direction D3. That is, the length of each rectangular opening OP extends in the direction D3 and the width of each rectangular opening that is greater than the length extends in the direction D1. In FIG. 5, the plurality of of rectangular openings OP are aligned with each other in the direction D3. As the above-described shaped opening OP is formed, when the press process is performed in one of the first area A1 and the second area A2, the stress transmission between the third area A3 and an area in which the press process is performed may be reduced. Accordingly, it is advantageous to secure the appearance quality of the display device.

Figure 6:
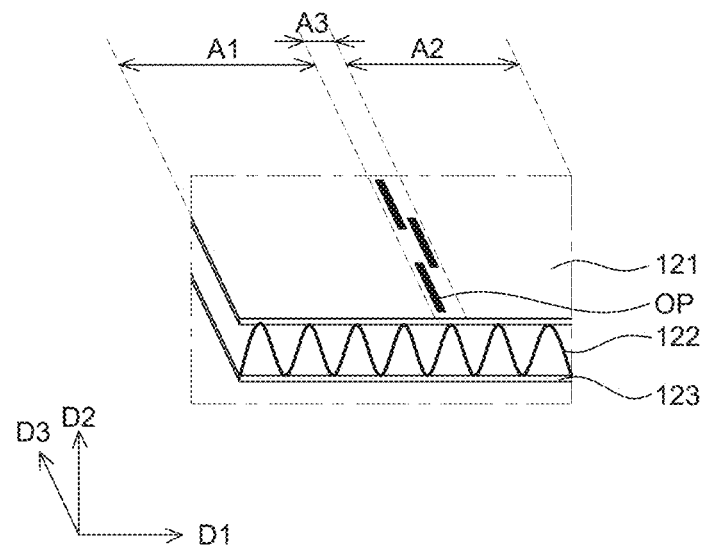

Referring to FIG. 6, in the third area A3, at least one rectangular opening OP disposed in a plurality of axial directions extending to the third direction D3 may be disposed.

That is, the at least one rectangular opening OP may be disposed to extend to be parallel to a plurality of straight lines extending to the third direction D3. That is, the length of each rectangular opening OP extends in the direction D3 and the width of each rectangular opening that is less than the length extends in the direction D1. As shown in FIG. 6, one rectangular opening OP is misaligned with a pair of rectangular openings OP that are aligned with each other in the direction D3. As the above-described shaped opening OP is formed, when the press process is performed in both the first area A1 and the second area A2, the stress transmission between the third area A3 and the first area A1 and third area A3 and the second area A2 may be reduced. Accordingly, it is advantageous to secure the appearance quality of the display device.

Figure 7:
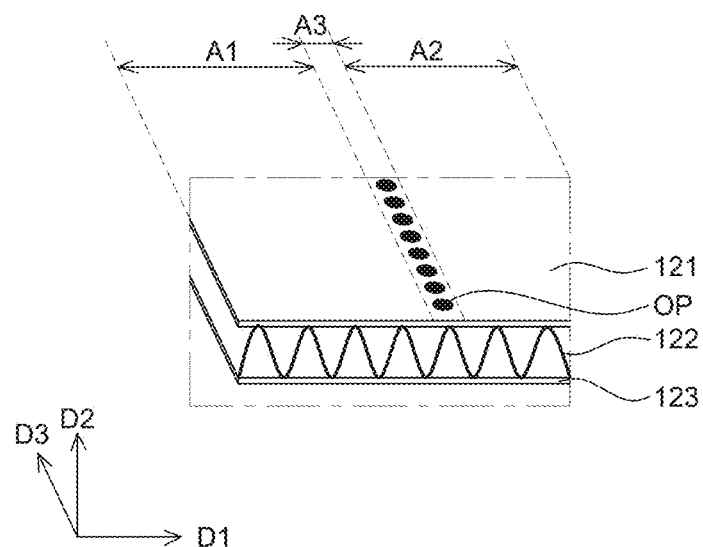

Referring to FIG. 7, in the third area A3, at least one circular opening OP disposed in one axial direction extending to the third direction D3 may be disposed. That is, the corrugated panel 120 has at least one circular opening OP in the plan view of the display device.

That is, the at least one circular opening OP may be disposed on one straight line extending to the third direction D3.

As the above-described opening OP is formed, when the press process is performed in one of the first area A1 and the second area A2, the stress transmission between the third area A3 and an area in which the press process is performed may be reduced. Specifically, the opening OP is formed to be circular so that the stress caused by the press may be dispersed without being concentrated in a specific region. Accordingly, it is advantageous to more surely secure the appearance quality of the display device.

Figure 8:
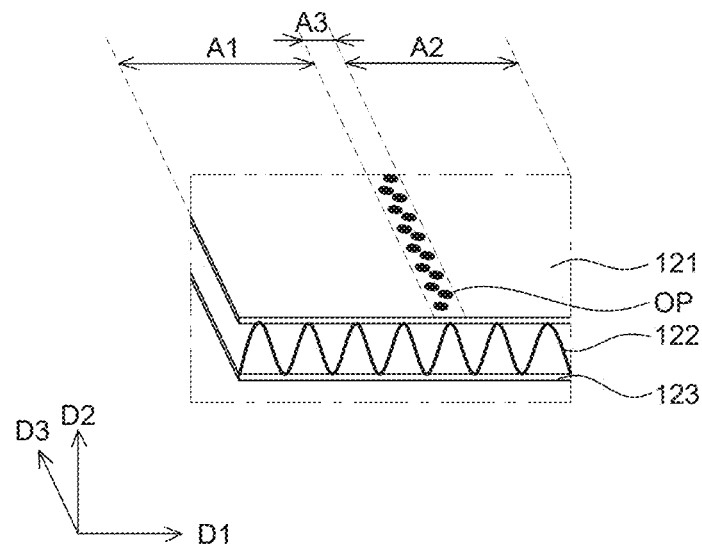

Referring to FIG. 8, in the third area A3, at least one circular opening OP disposed in a plurality of axial directions extending to the third direction D3 may be disposed. That is, the at least one circular opening OP may be disposed on a plurality of straight lines extending to the third direction D3. That is, the circular openings OP are arranged in a plurality of columns along the direction D3 in a zig-zag pattern. As the above-described shaped opening OP is formed, when the press process is performed in both the first area A1 and the second area A2, the stress transmission between the third area A3 and the first area A1 and third area A3 and the second area A2 may be minimized. Specifically, the opening OP is formed to be circular so that the stress caused by the press may be dispersed without being concentrated in a specific region. Accordingly, it is advantageous to more surely secure the appearance quality of the display device.

Figure 9:
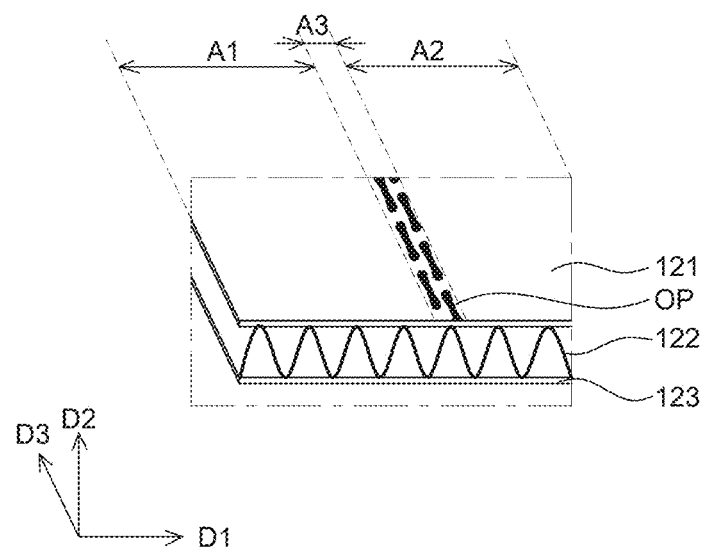

Referring to FIG. 9, in the third area A3, at least one circularly bonded opening OP disposed in a plurality of axial directions extending to the third direction D3 may be disposed. That is, the at least one circularly bonded opening OP may be disposed such that two circles are bonded to be parallel to on a plurality of straight lines extending to the third direction D3. That is, the circularly bonded opening OP are arranged in a plurality of columns along the direction D3. As the above-described shaped opening OP is formed, when the press process is performed in both the first area A1 and the second area A2, the stress transmission between the third area A3 and the first area A1 and third area A3 and the second area A2 may be minimized. Specifically, the opening OP is formed to be circularly bonded so that the stress caused by the press may be dispersed without being concentrated in a specific region. Accordingly, it is advantageous to more surely secure the appearance quality of the display device.

Figure 10:
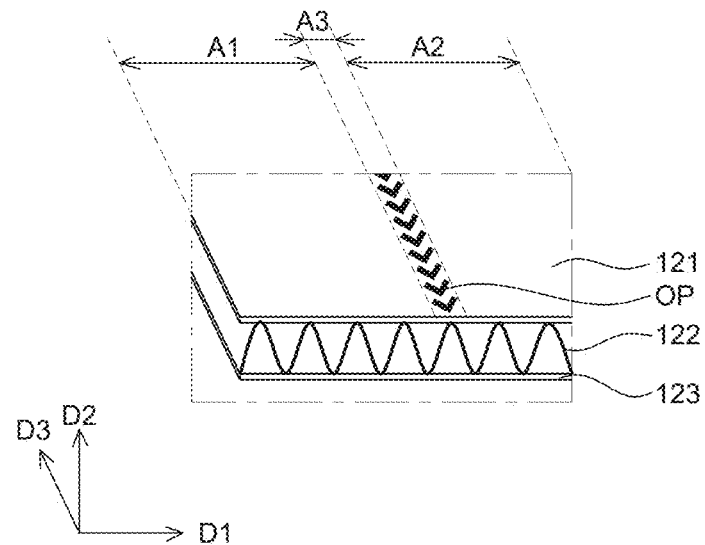

Referring to FIG. 10, in the third area A3, at least one "V" shaped opening OP or arrow shaped opening disposed in one axial direction extending to the third direction D3 may be disposed. That is, the at least one "V" shaped opening OP may be disposed on one straight line extending to the third direction D3. That is, the corrugated panel 120 has at least one "V" shaped opening OP in a plan view of the display device.

As the above-described shaped opening OP is formed, when the press process is performed in both the first area A1 and the second area A2, the stress transmission between the third area A3 and the first area A1 and third area A3 and the second area A2 may be reduced. Specifically, due to the shape of the "V" shaped opening OP, the third area A3 may be slanted while being maintained in a straight line, during the press process. Accordingly, it is advantageous to secure the appearance quality of the display device.

Figure 11:
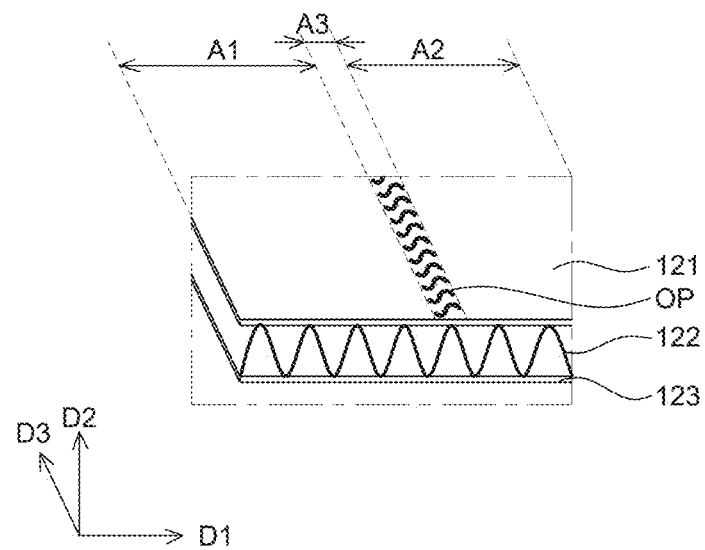

Referring to FIG. 11, in the third area A3, at least one "S" shaped opening OP having a concave portion and a convex portion disposed in one axial direction extending to the third direction D3 may be disposed. That is, the at least one "S" shaped opening OP may be disposed on one straight line extending to the third direction D3. That is, the corrugated panel 120 has at least one "S" shaped opening OP in a plan view of the display device.

As the above-described shaped opening OP is formed, when the press process is performed in both the first area A1 and the second area A2, the stress transmission between the third area A3 and the first area A1 and third area A3 and the second area A2 may be minimized. Specifically, due to the shape of the "S" shaped opening OP, a stress which is applied to the third area A3 during the press process may be effectively dispersed. Accordingly, it is advantageous to secure the appearance quality of the display device.

As described above, the opening OP may be deformed in various forms. In other words, the opening may be formed to occupy a predetermined area for every unit area so that the strength of each of the plurality of skin layers 121 and 123 may be adjusted.

For example, when an area occupied by the opening OP for every unit area is 0%, the strength of each of the plurality of skin layers 121 and 123 may be 100%. Additionally, when an area occupied by the opening OP for every unit area is 50%, the strength of each of the plurality of skin layers 121 and 123 may be 50%.

Therefore, in consideration of the efficiency of the press process and the rigidity of the display device, the area occupied by the opening OP is controlled to adjust the strength of each of the plurality of skin layers 121 and 123.

Hereinafter, a display device according to another exemplary embodiment of the present disclosure will be described.

The only difference between a display device according to another exemplary embodiment of the present disclosure and a display device according to the exemplary embodiment is a shape of the corrugated panel and a cohesion member bound thereto, which will be mainly described.

Figure 12:
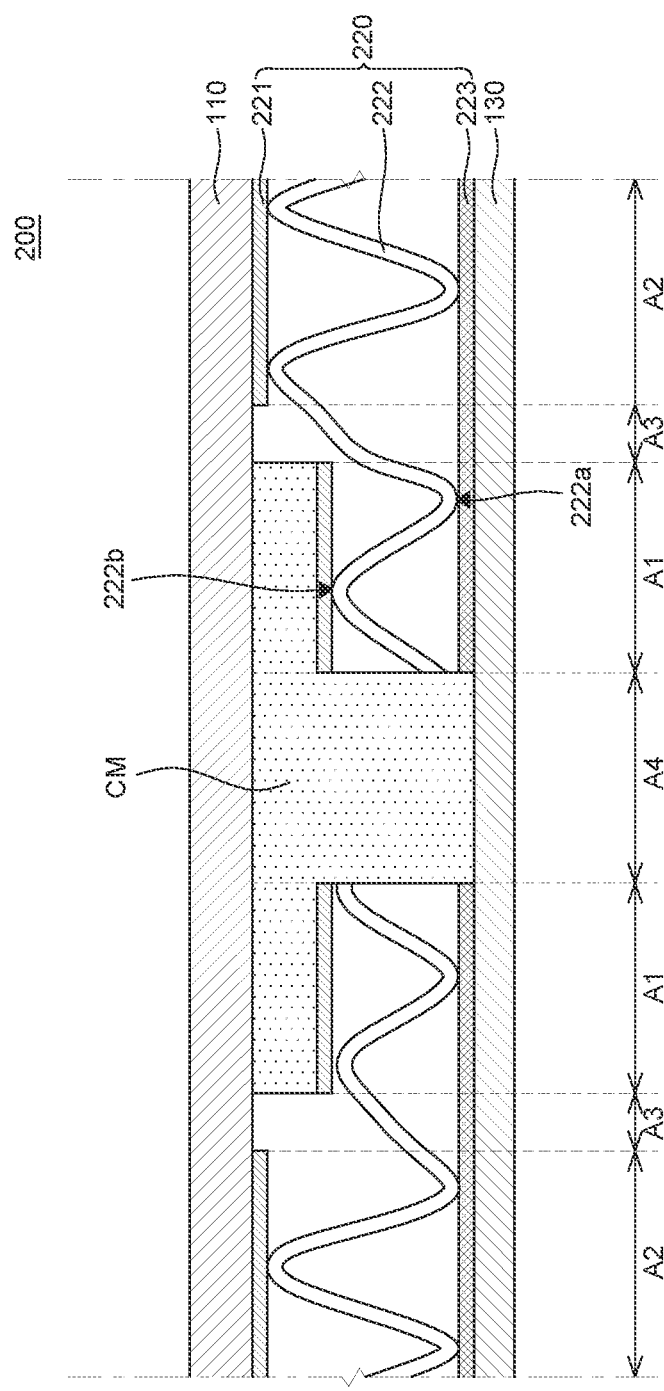
FIG. 12 is a cross-sectional view of a display panel, a corrugated panel, and a back cover of a display device according to another exemplary embodiment of the present disclosure.

FIG. 12 is a cross-sectional view of a display panel, a corrugated panel, and a back cover of a display device according to another exemplary embodiment of the present disclosure.

Figure 13:
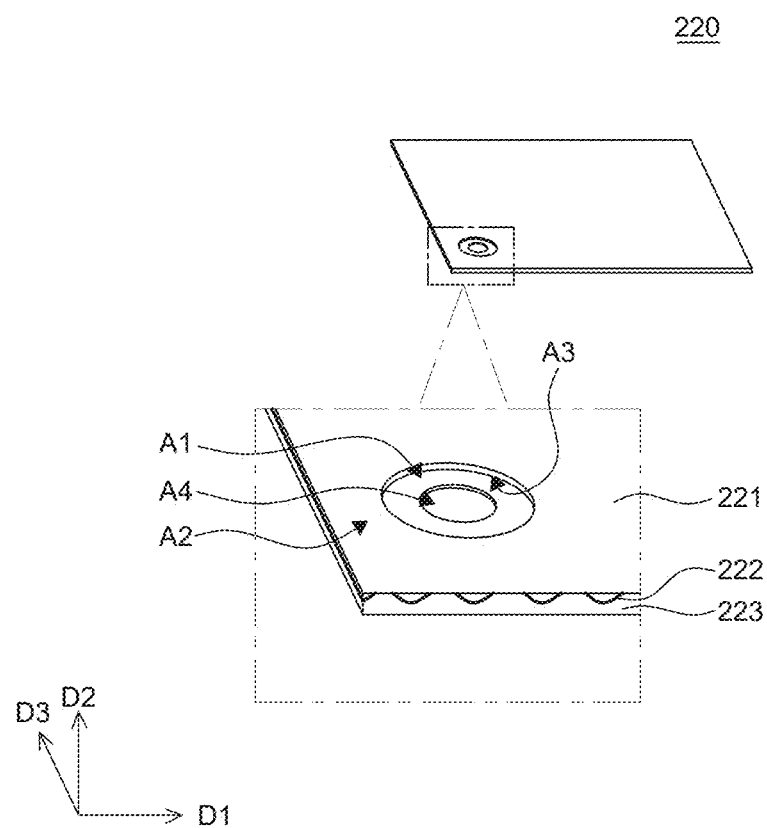
FIG. 13 is a perspective view of a corrugated panel of a display device according to another exemplary embodiment of the present disclosure.

FIG. 13 is a perspective view of a corrugated panel of a display device according to another exemplary embodiment of the present disclosure.

As illustrated in FIGS. 12 and 13, a display device 200 according to another exemplary embodiment of the present disclosure may be divided into a first area A1, a second area A2, a third area A3, and a fourth area A4 through a center of the first area A1 depending on a shape of the corrugated panel 220.

Each of the first areas A1, the third area A3, and the fourth area A4 may be formed to have a circular shape. In the third area A3, the first area A1 and the fourth area A4 may be disposed. The fourth area A4 may be disposed in the first area A1.

The corrugated panel 220 completely passes through the fourth area A4 to completely remove the first skin layer 221, the core layer 222, and the second skin layer 223 of the corrugated panel 220. That is, in the fourth area A4, a groove formed by removing the first skin layer 221, the core layer 222, and the third skin layer 223 may be disposed.

The cohesion member CM may be disposed over the first area A1 and the fourth area A4. As shown in FIG. 12, the cohesion member CM is between the back cover 130 and the display panel 110 in the fourth area A4 and between the first skin layer 221 and the display panel 110 in the first area A1. The cohesion member CM may be a member which couples the display panel 110 to the back cover 130. The cohesion member CM may be a mechanical cohesion member, such as a screw or a chemical cohesion member, such as an adhesive.

A thickness of the corrugated panel 220 disposed in the first area A1 and a thickness of the corrugated panel 220 disposed in the second area A2 may be different.

The cohesion member CM is disposed between the corrugated panel 220 and the display panel 210 disposed in the first area A1 so that the thickness of the corrugated panel 220 disposed in the first area A1 may be the thinnest amongst the other areas of the corrugated panel 220.

The cohesion member CM is not disposed between the corrugated panel 220 and the display panel 210 disposed in the second area A2 so that the thickness of the corrugated panel 220 disposed in the second area A2 may be the thickest amongst the other areas of the corrugated panel 220.

That is, a distance between the first skin layer 221 and the second skin layer 223 disposed in the first area A1 and a distance between the first skin layer 221 and the second skin layer 223 disposed in the second area A2 may be different. In other words, the thickness of the core layer 222 disposed in the first area A1 or the distance between the ridge 222b and the groove 222a of the core may be different from the thickness of the core layer 222 disposed in the second area A2 or the distance between the ridge 222b and the groove 222a of the core.

To be more specific, the distance between the first skin layer 221 and the second skin layer 223 disposed in the first area A1 may be shorter than the distance between the first skin layer 221 and the second skin layer 223 disposed in the second area A2. In other words, the thickness of the core layer 222 disposed in the first area A1 may be thinner than the thickness of the core layer 222 disposed in the second area A2. Alternatively, the distance between the ridge 222b and the groove 222a disposed in the first area A1 may be shorter than the distance between the ridge 222b and the groove 222a disposed in the second area A2.

In the meantime, at least one opening may be formed in at least one of the first skin layer 221 and the second skin layer 223 disposed in the third area A3.

Specifically, as illustrated in FIG. 13, the first skin layer 221 of the third area A3 extending in the third direction D3 may include a circular opening.

As described above, in the display device 200 according to another exemplary embodiment of the present disclosure, at least one opening may be formed in at least one of the first skin layer 221 and the second skin layer 223.

Unlike the display device 200 according to another exemplary embodiment of the present disclosure, when the opening is not formed in the first skin layer 221 and the second skin layer 223, when a piercing process is performed to dispose the cohesion member CM in a partial area of the first skin layer 221, a stress caused by the piercing is transmitted to the second skin layer 123 corresponding to the partial area of the first skin layer 221 due to the coupling of the plurality of skin layers 221 and 123 and the core layer 222.

Accordingly, there was a problem in that the second skin layer 223 was dented or the appearance quality was degraded.

Unlikely, as in the display device 200 according to another exemplary embodiment of the present disclosure, when at least one opening is formed in at least one of the first skin layer 221 and the second skin layer 223, even though the piercing process is performed in a partial area of the first skin layer 221, the opening is formed in the first skin layer 221. Therefore, the stress caused by the piercing is not transmitted to the core layer 222.

Accordingly, even though the plurality of skin layers 221 and 123 and the core layer 222 are coupled, the piercing stress caused is not transmitted to the core layer 222 so that the stress caused by the piercing is not transmitted to the second skin layer 223.

As a result, it is advantageous also to secure the appearance quality of the display device according to another exemplary embodiment of the present disclosure.

The exemplary embodiments of the present disclosure can also be described as follows:

According to an aspect of the present disclosure, a display device includes a display panel which implements an image; a corrugated panel disposed on a rear surface of the display panel; and a back cover which encloses the display panel and the corrugated panel, and the corrugated panel includes a first skin layer, a second skin layer, and a core layer disposed between the first skin layer and the second skin layer, and at least one opening is formed in at least one of the first skin layer and the second skin layer to improve the appearance quality of the display device.

A thickness of the corrugated panel disposed in a first area and a thickness of a corrugated panel disposed in a second area may be different, and the at least one opening may be formed in a third area disposed between the first area and the second area.

In the third area, at least one groove formed by removing the first skin layer, the second skin layer, and the core layer may be disposed.

A distance of the first skin layer and the second skin layer disposed in the first area and a distance of the first skin layer and the second skin layer disposed in the second area may be different.

A wavy core may be disposed in the core layer with respect to a plane for a first direction and a second direction.

A thickness of the core layer disposed in the first area may be different from a thickness of the core layer disposed in the second area.

At least one rectangular opening disposed in one axial direction extending in a third direction may be disposed in the third area.

At least one rectangular opening disposed in a plurality of axial directions extending in a third direction may be disposed in the third area.

At least one circular opening disposed in one axial direction extending in a third direction may be disposed in the third area.

At least one circular opening disposed in a plurality of axial directions extending in a third direction may be disposed in the third area.

At least one "V" shaped opening disposed in at least one axial direction extending in a third direction may be disposed in the third area.

At least one "S" shaped opening disposed in at least one axial direction extending in a third direction may be disposed in the third area.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:
   a display panel configured to display an image;
   a corrugated panel on a rear surface of the display panel, the corrugated panel comprising a first skin layer, a second skin layer, and a core layer between the first skin layer and the second skin layer; and
   a back cover that encloses the display panel and the corrugated panel,
   wherein at least one of the first skin layer or the second skin layer comprises an opening through a thickness of at least one of the first skin layer or the second skin layer,
   wherein a thickness of a first portion of the corrugated panel in a first area is different from a thickness of a second portion of the corrugated panel in a second area, and at least one opening is in a third area of the corrugated panel that is between the first area and the second area, and
   wherein a fourth portion of the corrugated panel in a fourth area that is at a center of the first area includes at least one groove through the first skin layer, the second skin layer, and the core layer in the fourth area.

2. The display device according to claim 1, wherein a distance between the first skin layer and the second skin layer in the first area is different from a distance between the first skin layer and the second skin layer in the second area.

3. The display device according to claim 1, wherein the core layer comprises a plurality of ridges and a plurality of grooves that are alternately disposed, each of the plurality of ridges protruding from a centerline of the core layer to the second skin layer and each of the plurality of grooves protruding from the centerline of the core layer to the first skin layer.

4. The display device according to claim 3, wherein a thickness of the core layer in the first area is different from a thickness of the core layer in the second area.

5. The display device according to claim 1, wherein the opening comprises at least one rectangular opening in the third area along one axial direction in the third area.

6. The display device according to claim 1, wherein the opening comprises a plurality of rectangular openings in the third area, each rectangular opening extending along a different axial direction from at least another rectangular opening from the plurality of rectangular openings in the third area.

7. The display device according to claim 1, wherein the opening comprises at least one circular opening in the third area that extends along one axial direction.

8. The display device according to claim 1, wherein the opening comprises a plurality of circular openings, each circular opening extending along a different axial direction from at least another circular opening from the plurality of circular openings in the third area.

9. The display device according to claim 1, wherein the opening comprises at least one "V" shaped opening in the third area that extends along at least one axial direction.

10. The display device according to claim 1, wherein the opening comprises at least one "S" shaped opening in the third area that extends along at least one axial direction in the third area.

11. A display device comprising:
    a display panel configured to display an image;
    a back cover including a cavity; and
    a corrugated panel between the display panel and the back cover such that the display panel and the corrugated panel are disposed in the cavity of the back cover,
    wherein the corrugated panel includes an opening through at least a portion of the corrugated panel, a first skin layer, a second skin layer and a core layer between the first skin layer and the second skin layer, the core layer including a plurality of alternating first protrusions and second protrusions where each first protrusion contacts the first skin layer and each second protrusion contacts the second skin layer,
    wherein a thickness of a first portion of the corrugated panel in a first area is different from a thickness of a second portion of the corrugated panel in a second area, and the opening is in a portion of the first skin layer in a third area of the corrugated panel that is between the first area and the second area, and wherein a fourth portion of the corrugated panel in a fourth area that is at a center of the first area includes at least one groove through the first skin layer, the second skin layer, and the core layer in the fourth area.

12. The display device of claim 11, wherein a distance between the first skin layer and the second skin layer in the first area is different from a distance between the first skin layer and the second skin layer in the second area.

13. The display device of claim 12, further comprising:
a cohesion member configured to couple the display panel to the back cover, the cohesion member between the back cover and the display panel in the fourth area and between the first skin layer and the display panel in the first area.

14. The display device of claim 11, wherein a thickness of a first portion of the corrugated panel in the first area is less than a thickness of a second portion of the corrugated panel in the second area.

15. The display device of claim 11, wherein the opening comprises one of at least one rectangular opening in a plan view of the display device, at least one circular opening in the plan view of the display device, at least one "V" shaped opening in the plan view of the display device, or at least one "S" shaped opening in the plan view of the display device.

* * * * *